United States Patent
Busse et al.

(10) Patent No.: US 11,573,307 B2
(45) Date of Patent: Feb. 7, 2023

(54) OPTICAL ACQUISITION DEVICE FOR A MOTOR VEHICLE, WHEREIN THE OPERATION OF A LIGHT SOURCE UNIT IS CARRIED OUT IN DEPENDENCE ON A FUNCTIONAL STATE OF THE HOUSING, METHOD, AND MOTOR VEHICLE

(71) Applicant: Valeo Schalter und Sensoren GmbH, Bietigheim-Bissingen (DE)

(72) Inventors: Gunnar Busse, Bietigheim-Bissingen (DE); Andreas Reichert, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 627 days.

(21) Appl. No.: 16/609,040

(22) PCT Filed: Apr. 24, 2018

(86) PCT No.: PCT/EP2018/060417
§ 371 (c)(1),
(2) Date: Oct. 28, 2019

(87) PCT Pub. No.: WO2018/197452
PCT Pub. Date: Nov. 1, 2018

(65) Prior Publication Data
US 2020/0096622 A1    Mar. 26, 2020

(30) Foreign Application Priority Data
Apr. 28, 2017   (DE) .......................... 102017109138.6

(51) Int. Cl.
*G01S 7/497*        (2006.01)
*G01S 17/931*       (2020.01)
(Continued)

(52) U.S. Cl.
CPC ............ *G01S 7/497* (2013.01); *B60W 50/14* (2013.01); *G01S 7/4813* (2013.01);
(Continued)

(58) Field of Classification Search
CPC .. H05B 3/84; G01S 2007/4975; F21S 41/176; F21S 41/33
See application file for complete search history.

(56) References Cited

U.S. PATENT DOCUMENTS

| | | | | |
|---|---|---|---|---|
| 2005/0184259 | A1* | 8/2005 | Terui | G01N 21/958 250/559.45 |
| 2010/0245849 | A1* | 9/2010 | Satzky | G01S 7/4972 356/622 |
| 2015/0003098 | A1* | 1/2015 | Bony | F21S 41/36 362/509 |

FOREIGN PATENT DOCUMENTS

| | | |
|---|---|---|
| DE | 19644164 A1 | 4/1998 |
| DE | 10329095 B3 | 3/2005 |

(Continued)

OTHER PUBLICATIONS

The Notice of Final Rejection issued in corresponding Korean Application No. 10-2019-7032877, dated Jul. 30, 2021 (6 pages).
(Continued)

*Primary Examiner* — Mirza F Alam
(74) *Attorney, Agent, or Firm* — Osha Bergman Watanabe & Burton LLP

(57) ABSTRACT

The invention relates to an optical acquisition device (3) for a motor vehicle (1), having a housing (8) of the optical acquisition device (3), in which a light source unit (10) of the optical acquisition device (3) is arranged, wherein light beams (6) can be emitted by means of the light source unit (10) through a housing part (9) of the housing (8) into surroundings (4) of the motor vehicle (1), wherein the optical acquisition device (3) comprises a checking unit
(Continued)

Figure 1:
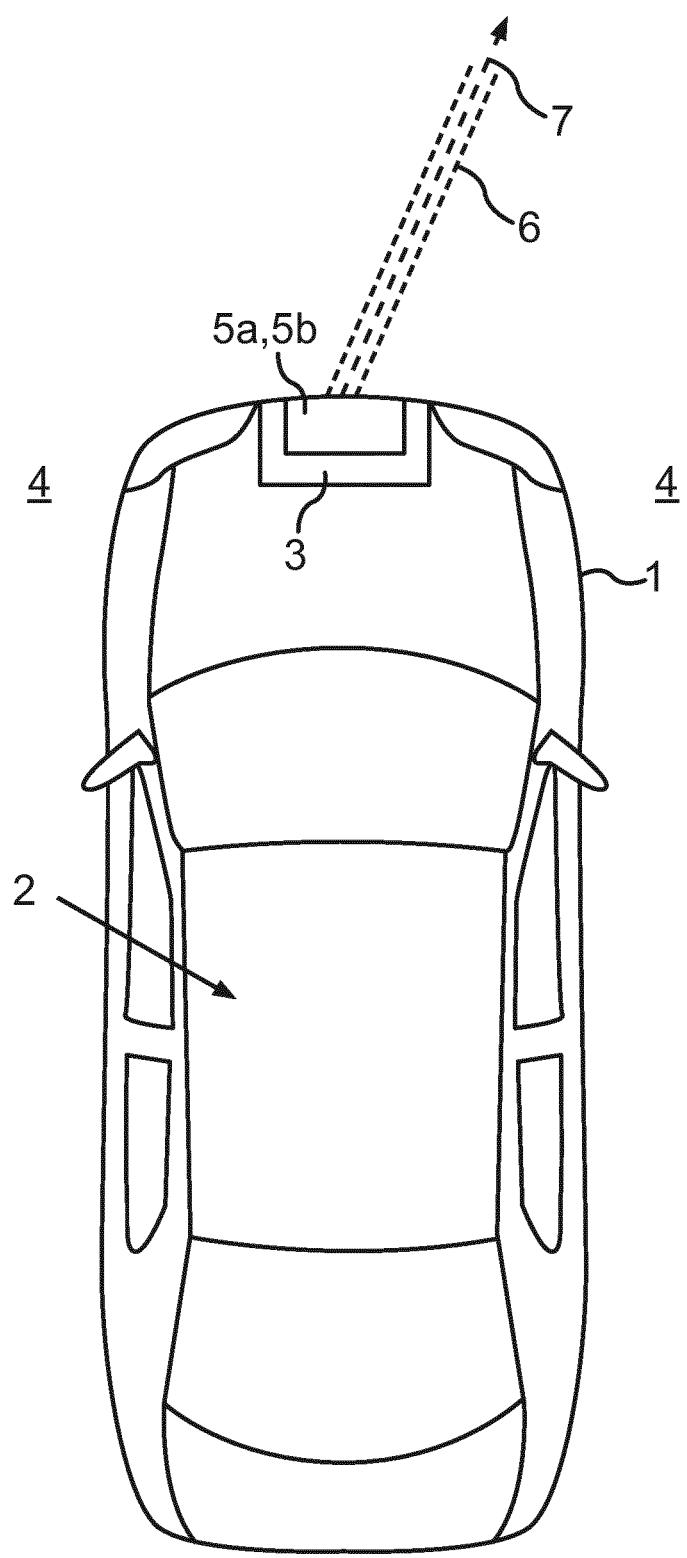

(16), by means of which a functional state of the housing (8) is checkable, and if an actual functional state of the housing (8) deviating from a reference functional state of the housing (8) is detected, a control signal can be generated. The invention furthermore relates to a motor vehicle (1) and a method.

13 Claims, 2 Drawing Sheets

(51) Int. Cl.
B60W 50/14 (2020.01)
G01S 7/481 (2006.01)
(52) U.S. Cl.
CPC ...... *G01S 17/931* (2020.01); *B60W 2050/146* (2013.01); *B60W 2420/52* (2013.01); *G01S 2007/4975* (2013.01)

(56) References Cited

FOREIGN PATENT DOCUMENTS

| | | |
|---|---|---|
| DE | 102011122345 A1 | 6/2013 |
| DE | 102014114363 A1 | 4/2016 |
| JP | H07-167945 A | 7/1995 |
| JP | H08-015414 A | 1/1996 |
| KR | 2014-0103982 A | 8/2014 |
| WO | 2016/147759 A1 | 9/2016 |

OTHER PUBLICATIONS

International Search Report and Written Opinion corresponding to International Application No. PCT/EP2018/060417, dated Aug. 3, 2018 (16 pages).
German Search Report issued in corresponding German Application No. 10 2017 109 138.6, dated Mar. 1, 2018 (10 pages).
Office Action in corresponding European Application No. 18719859.3, dated Nov. 25, 2021 (5 pages).

* cited by examiner

OPTICAL ACQUISITION DEVICE FOR A MOTOR VEHICLE, WHEREIN THE OPERATION OF A LIGHT SOURCE UNIT IS CARRIED OUT IN DEPENDENCE ON A FUNCTIONAL STATE OF THE HOUSING, METHOD, AND MOTOR VEHICLE

The present invention relates to an optical acquisition device for a motor vehicle. Light beams can be emitted through a housing part of a housing from the housing into surroundings of the motor vehicle using a light source unit of the optical acquisition device arranged in the housing of the optical acquisition device. Furthermore, the invention relates to a method and a motor vehicle.

In the present case, interest is directed to an optical acquisition device for a motor vehicle, in particular a laser scanner. A surrounding region of the motor vehicle can be monitored by means of the optical acquisition device. In this case, objects in the surrounding region of the motor vehicle can be acquired and items of information about the acquired object, for example, geometric dimensions of the object and a distance of the object from the motor vehicle, can be provided to a driver assistance system. In laser scanners, light beams, in particular a laser beam, of the laser scanner are typically emitted and reflected via a deflection mirror into the surrounding region. The light is reflected at the object in the surrounding region back to the deflection mirror and thereupon acquired. The deflection mirror is generally mounted so it is rotatable in this case and is driven by means of a drive unit to rotate around an axis of rotation. The light beams are deflected in various scanning emission directions and the surrounding region is thus scanned. At least the light source unit in particular is arranged inside a housing of the optical acquisition device in this case.

DE 10 2014 114 363 A1 discloses a window cap for a housing of an optoelectronic measuring device. To improve the operability of an optoelectronic measuring device under cold weather conditions, it is provided that the window cap is formed having a window transparent to electromagnetic measurement beams of the measuring device and a border wall, which is formed at an angle to the window and forms a peripheral contour. The window cap is pushed externally onto a peripheral window border of the housing and fastened in a section of the border wall overlapping the window border. To remove deposits from weather influences on the housing, a cover plate of the housing is heated indirectly via at least one electrical heating conductor. In particular, the heating unit is essentially located in the region of the receiving window.

In the optical acquisition device from the prior art, it can occur that in the event of an open housing and/or in the event of a defect of the housing, light beams inadvertently, in particular with an elevated power, from the light source unit because of the open housing and/or the defective housing, whereby safety-critical states can result with respect to the light beams exiting in an undefined manner.

The object of the present invention is to provide an optical acquisition device, a method, and a motor vehicle, with which safety-critical operating states are avoided.

This object is achieved by an optical acquisition device, a method, and a motor vehicle according to the independent claims.

One aspect of the invention relates to an optical acquisition device for a motor vehicle. The optical acquisition device is designed to acquire objects in the surroundings of the motor vehicle. The optical acquisition device comprises a light source unit of the optical acquisition device arranged in a housing of the optical acquisition device, in which light beams can be emitted through a housing part of the housing out of the housing into surroundings of the motor vehicle.

The optical acquisition device comprises a checking unit, by means of which a functional state of the housing is checkable. If an actual functional state of the housing deviating from a reference functional state of the housing is detected, a control signal can be generated.

This has the advantage that the functional state of a component influencing the emission of the light beams, namely the housing, is monitored. An adversely affecting emission is in particular an emission deviating from a reference emission. In particular, the functional state which is thus present can be accurately categorized by the comparison of the reference functional state to the actual functional state. If the detected functional state should then not correspond to the reference functional state, an operating state with respect to the emission of the light beams can be presumed which is undesired and can result in safety-critical situations, in particular if the light beam exit which is no longer defined with respect to direction is incident on a person.

In particular, the mode of the light source unit upon the detection of the undesired actual functional state deviating from the reference functional state can be a defined emergency mode. This emergency mode can be predetermined in such a way that safety-critical situations are avoided, but in particular the emission of the light beams is not entirely deactivated.

The housing part can be, for example, a transparent pane, through which the light beams can be emitted into the surroundings and by which a receptacle chamber of the acquisition device, in which optical components are arranged, is closed, so that these components are arranged in a protected manner.

According to one advantageous embodiment, the functional state of the housing is checkable by means of the checking unit and if an actual functional state of the housing part deviating from the reference functional state of the housing part is detected, a control signal can be generated. In particular, it can be provided that in the functional state, which is different from the reference functional state in the case of the reference emission, the light source unit is operated in dependence on the control signal. It is possible in this case that the removal of the housing part from the housing can be detected and accordingly upon a removal of the housing or upon a removal of the housing part, the light source unit can be operated accordingly. A safer operation of the optical acquisition device is thus implemented. Accordingly, this is then also possible if the housing part has a restricted state which impairs the emission of the light beams. For example, this can be a fracture of the housing part or a crack or a deep scratch.

It has furthermore proven to be advantageous if a housing part removed from the housing is an actual functional state deviating from the reference functional state.

In particular, it can be provided that a contact spring arranged on the housing is contacted with the housing part and as soon as the contact spring is no longer contacted with the housing part, the housing part is detected as removed. The actual functional state can thus be detected reliably upon removal of the housing part. If it is then detected that the housing part has been removed, the light source unit can then be operated accordingly adapted thereto.

It has furthermore proven to be advantageous if a fracture and/or a crack and/or a deep scratch of the housing part is an actual functional state deviating from the reference functional state. In particular, even small damage of the housing part, for example, by a rock strike or weather-related cracks, can then already be detected, which could result in impairment of the emission of the light beams. In particular, operating the optical acquisition device even more safely can thus be enabled.

According to a further advantageous embodiment, the housing and/or the housing part can at least regionally comprise an electrically conductive element integrated into the housing and/or into the housing part and a functional state of the housing is detectable by checking the electrical resistance of the electrically conductive element. In particular, it is provided that the electrically conductive element does not impair the emission of the light beams. In particular, the housing and/or the housing part can be connected over a large area to the electrically conductive element, whereby an extensive and multi-local check of the functional state can be implemented. In particular, an accurate inference of the functional state can be drawn by the check of the electrical resistance. For example, in the case of a low electrical resistance, it can be presumed that the reference functional state exists. In the case of a very high, in particular in the case of an essentially infinitely large electrical resistance, it can be concluded that an actual functional state which adversely affects the emission of the light beams exists. This has its background in that, for example, a crack and/or fracture of the electrically conductive element also accompanies a crack and/or fracture of the housing part. In the event of a crack and/or fracture of the electrically conductive element, it then has an essentially infinitely large resistance. The functional state can thus be checked particularly reliably using only one element and a safe and component-reduced optical acquisition device can thus also be implemented.

It is also advantageous if the at least one electrically conductive element is formed as a heating wire of a heating unit of the optical acquisition device. In particular, in addition to the check of the functional state, the electrically conductive element can also be designed to free the housing and/or the housing part from deposits from weather influences. In particular, a housing part covered with moisture can be freed of the condensation by means of the heating unit, for example, whereby the light beams can be emitted more reliably through the housing part. In particular, the heating unit can thus be provided with the electrically conductive element and the functional state of the housing and/or the housing part can be checked using the electrically conductive element. A highly-functional and component-reduced optical acquisition device can thus be provided.

In one advantageous embodiment, the electrically conductive element can be integrated in a meandering shape into the housing and/or the housing part. The housing and/or the housing part can be checked over a large area for the functional state in particular by way of the meandering integration of the electrically conductive element. Furthermore, improved heating of the housing and/or the housing part can be implemented by the meandering distribution, so that deposits because of the weather influences can thus also be removed in an improved manner. An improved optical acquisition device can thus be provided.

In particular, it is advantageous if a control signal can be generated upon detection of an actual functional state deviating from the reference functional state of at least the housing part of the housing, so that the light source unit is switched off or is not switched on. In other words, if the light source unit should already be switched on, the light source unit can thus be completely switched off upon detection of this actual functional state. If it should already be detected that this actual functional state exists before a start-up of the light source unit, switching on the light source unit can thus be prevented. In particular, a person can thus be protected from an undesired emission in an unexpected direction by the light beams of the light source unit.

It has furthermore proven to be advantageous if a control signal can be generated upon detection of an actual functional state deviating from the reference functional state of at least the housing part of the housing, so that the light beams are emitted having reduced power of the light source unit in comparison to the reference functional state but the emission is not completely deactivated. In particular, it is provided that the power of the light source unit is reduced in such a way that an adverse effect on a person located in the surroundings of the detection unit is avoided. Nonetheless, a further active mode of the acquisition device is enabled to a certain extent and/or in a restricted manner. In particular, for example, the acquisition range of the optical acquisition device can then be reduced as a result of the lower power of the light source unit. Nonetheless, in particular in the nearby region of the motor vehicle, a further acquisition of the surroundings can be implemented, so that the optical acquisition device can still acquire the surroundings, for example, in an emergency mode, even upon a detected undesired actual functional state. The surroundings can thus still be acquired even upon a detected undesired actual functional state without adversely affecting a person.

It has also proven to be advantageous if the functional state is checkable, in particular is checked, in a driving mode of the motor vehicle and/or at a standstill of the motor vehicle. In particular, the functional state can be checked in a semi-autonomous driving mode, in particular in a fully autonomous mode of the motor vehicle. In particular, the functional state can also be checked at a standstill, for example, before a departure of the motor vehicle. In particular, the optical acquisition device can thus be checked with respect to a housing impairment both in the driving mode and also at a standstill, so that an adverse effect on a person is avoided in both operating states.

According to one advantageous embodiment, upon occurrence of the actual functional state deviating from the reference functional state, an item of functional state information can be generated, in particular is generated, for a control unit of the optical acquisition device and/or the motor vehicle, in particular an error message. Further steps can thus be initiated in particular, for example. In particular, for example, it can be provided that after the generation of the item of functional state information, it is transmitted to a motor-vehicle-external device. For example, in this case this can be a motor-vehicle-external device of the vehicle producer and/or a repair shop. In particular, a more rapid repair of the optical acquisition device can thus be implemented.

Furthermore, it can thus be implemented that, for example, the driver assistance system, by means of which the optical acquisition device can be coupled, receives the item of functional state information and thus switches in other sensors, for example, to compensate, for example, for a defect of the optical acquisition device. In particular in a semi-autonomous driving mode, in particular in the case of a fully autonomous driving mode, further maneuvers, in particular a reduction of the speed, can then be effectuated. An enhanced level of safety is thus implemented even with an impaired and/or defective optical acquisition device.

It has furthermore proven to be advantageous if the item of functional state information is displayable, in particular is displayed on a display unit of a motor vehicle. In particular, for example, an occupant, in particular a driver, of the motor vehicle can then be informed about the functional state of the optical acquisition device. In particular, the failure and/or the switching off of the optical acquisition device can then be displayed to the driver. It is also possible that the reduction of the power of the emitted light beams is displayed to the driver, so that the driver is made aware, for example, about the restricted acquisition range at reduced power of the emitted light beams. This has the advantage that a safer control of the motor vehicle by the driver is thus implemented.

It is also advantageous if the functional state of the housing and/or the housing part is checkable, in particular is checked, multiple times, in particular at predetermined time intervals. In particular, for example, the functional state can thus be checked multiple times in a driving mode of the motor vehicle, so that a change of the functional state, in particular from the reference functional state to the undesired actual functional state, is recognized early, so that the possibility of an adverse effect on a person is recognized early and an adverse effect on the person is reduced by means of the method according to the invention.

Furthermore, the invention relates to a motor vehicle having an optical acquisition device. The motor vehicle is designed in particular as a passenger vehicle.

A further aspect of the invention relates to a method for operating an optical acquisition device for a motor vehicle. The optical acquisition device comprises at least one light source unit of the optical acquisition device arranged in a housing of the optical acquisition device. By means of the light source unit, light beams are emitted through a housing part of the housing from the housing into surroundings of the motor vehicle. A functional state of the housing is checked by means of a checking unit. Upon detecting an actual functional state of the housing deviating from a reference functional state, a control signal is generated.

The above-described optical acquisition device and the motor vehicle comprise features according to the subject matter for this purpose, which enable the method according to the invention or an advantageous embodiment thereof to be carried out.

Advantageous embodiments of the optical acquisition device are to be considered advantageous embodiments of the method and of the motor vehicle.

Further features of the invention result from the claims, the figures, and the description of the figures. The features and feature combinations mentioned above in the description and also the features and feature combinations mentioned hereafter in the description of the figures and/or solely shown in the figures are usable not only in the respective specified combination but rather also in other combinations and alone without leaving the scope of the invention. Therefore, embodiments of the invention are also to be considered to be comprised and disclosed which are not explicitly shown in the figures and explained, but originate and can be created from separate feature combinations from the explained embodiments. Embodiments and feature combinations are also to be considered to be disclosed which therefore do not comprise all features of an originally formulated claim. In addition, embodiments and feature combinations are to be considered to be disclosed, in particular by the above-described embodiments, which go beyond or deviate from the feature combinations represented by the references of the claims.

Exemplary embodiments are explained hereafter on the basis of schematic drawings.

Figure 2:
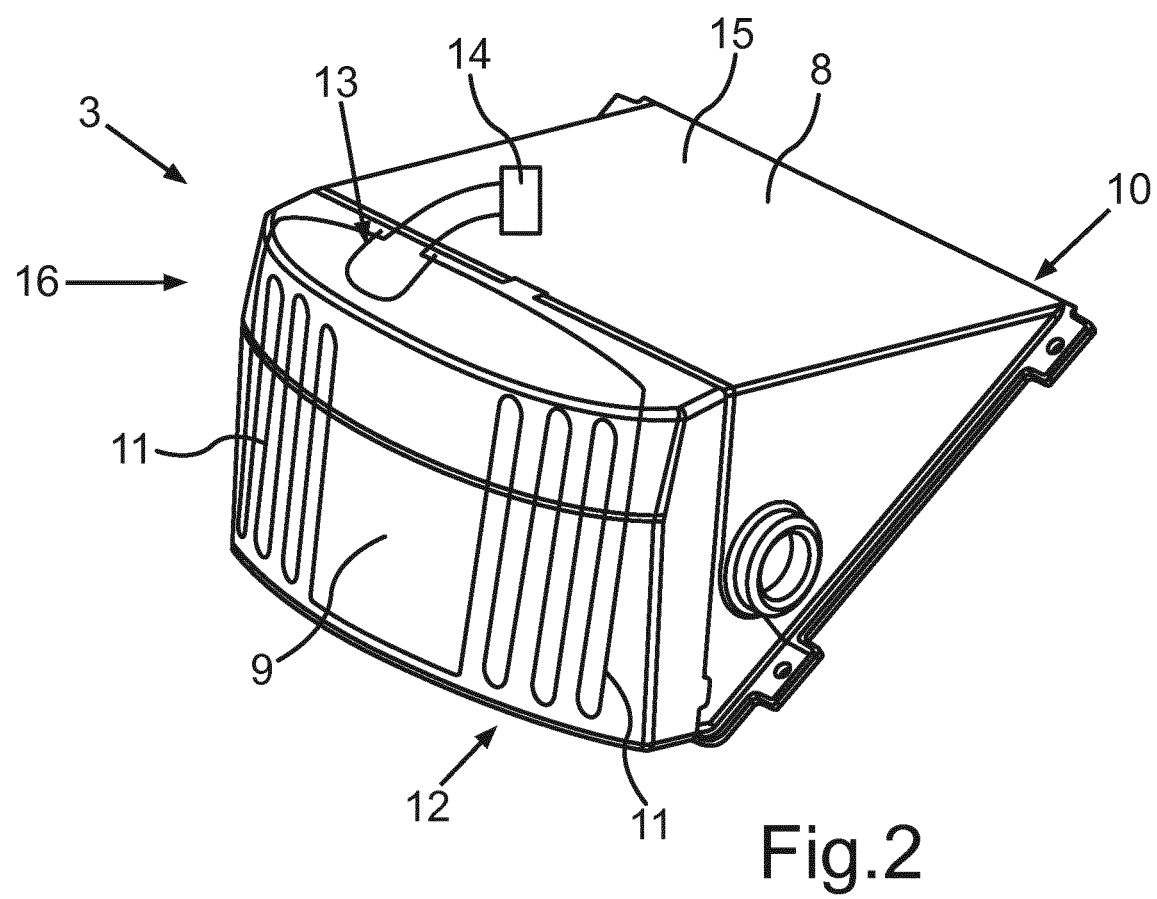

In the figures:

FIG. 1 shows a motor vehicle according to one embodiment of the invention, which comprises an optical acquisition device; and FIG. 2 shows a schematic perspective view of an embodiment of an optical acquisition device.

In the figures, identical and functionally-identical elements are provided with the same reference signs.

FIG. 1 shows a motor vehicle 1 according to one embodiment of the present invention. The motor vehicle 1 is designed in the present case as a passenger vehicle. The motor vehicle 1 comprises a driver assistance system 2, which can be embodied, for example, as a parking assistance system. The motor vehicle 1 additionally comprises at least one optical acquisition device 3, which is embodied in particular as a laser scanner. A position of the optical acquisition device 3 on the motor vehicle 1 can be diverse in this case. The optical acquisition device 3 is used to scan a surrounding region 4 of the motor vehicle 1. In this case, light beams 6 generated by an emitting unit 5a of the optical acquisition device 3 are emitted at predetermined scanning points in time in scanning emission directions 7 corresponding to the predetermined scanning points in time into the surrounding region 4 of the motor vehicle 1. The light beams 6 reflected in the surrounding region 4 can be received by receiving unit 5b of the optical acquisition device 3. The items of information provided by the optical acquisition device 3 about the surrounding region 4, for example, a distance or geometric dimensions of an object in the surrounding region 4, can be provided to the driver assistance system 2.

FIG. 2 shows a schematic perspective view of an embodiment of the optical acquisition device 3. The optical acquisition device 3 comprises a housing 8 having a housing part 9. A light source unit 10 is arranged inside the housing 8. The light beams 6 can be emitted through the housing part 9 from the housing 8 into the surroundings 4 of the motor vehicle 1 in an acquisition mode of the optical acquisition device 3. In particular, for example, the housing part 9 can be formed transparently in this case. The housing part 9, which is in particular a front cover, can be designed in particular as removable, so that the housing part 9 is removable from the remaining housing body 15 of the housing 8, for example, to obtain access to the light source unit 10.

In particular, it can be provided that an electrically conductive element 11 is integrated into the housing body 15 and/or in the housing part 9. In the present case, the electrically conductive element 11 is integrated at least into the housing part 9. In particular, it can be provided that the electrically conductive element 11 is formed as part of a heating unit 12 of the optical acquisition device 3. In particular, for example, a condensation of the housing part 9 with moisture as a result of weather conditions can then be removed by means of the heating unit 12. In particular, the electrically conductive element 11 of the heating unit 12 is laid in a meandering shape as a heating wire within the housing 8, in particular within the housing part 9. In particular, the electrically conductive element 11 is electrically coupled via a contact spring 13 with a control unit 14 of the optical acquisition device.

It is provided that a functional state of the housing 8 is checkable and is checked by means of a checking unit 16. If an actual functional state of the housing 8 deviating from a reference functional state is detected, a control signal is generated for the light source unit. In particular, the operation which is then carried out can be a so-called emergency mode of the light source unit 10, which is also in particular set immediately after the detection of the undesired actual functional state.

In particular, it is provided that the functional state of the housing part 9 is checkable and is checked by means of the checking unit 16 and upon detection of an actual functional state of the housing part 9 deviating from a reference functional state, a control signal is generated for the light source unit. In particular, it is provided that it can be detected, for example, by means of the contact spring 13, as part of the checking unit 16, whether the housing part 9 has been completely removed from the housing 8. If, for example, the housing part 9 should have been removed from the housing 8, the contact between the contact spring 13 and the control unit 14 is thus interrupted. Due to the opening of the housing 8, the light beams 6 could be emitted in undefined directions and could adversely affect a person in the surroundings 4, in particular the eyes of the person, because of excessively high power of the light beams 6. It is also possible that, for example, an undefined emission of the light beams 6 could take place due to a fracture and/or crack of the housing part 9 and could adversely affect a person. It can therefore be provided that the light source unit 10 is completely deactivated upon the detection of the actual functional state. If light source unit 10 should not be switched on, switching on of the light source unit 10 can thus be suppressed. In particular, it can also be provided that the light beams 6 are emitted with a reduced power of the light source unit 10 in comparison to the reference functional state upon detection of the actual functional state. In other words, the light beams 6 have a lower energy than in the case of the reference emission, so that an adverse effect on the person is reduced.

In particular, it is provided that the electrical resistance of the electrical element 11 is acquired to check and/or categorize the functional state of the optical acquisition device 3 in dependence thereon. In particular, the undesired actual functional state can be detected, in particular by means of the control unit 14, in the case of a high electrical resistance, in particular in the case of an essentially infinite electrical resistance.

In particular, it is provided that the functional state is checked in a driving mode of the motor vehicle 1 and/or at a standstill of the motor vehicle 1. The check of the optical acquisition device 3 can thus be carried out in particular in every operating mode of the motor vehicle 1. In particular, the driving mode can be a semi-autonomous, in particular a fully autonomous driving mode.

In particular, it can be provided that upon occurrence of the undesired actual functional state, i.e., for example, upon removal of the housing part 9 from the housing 8 or in the event of a fracture and/or crack of the housing part 9, an item of functional state information characterizing this is generated for the control unit 14, in particular an error message.

The control unit 14 can alternatively also be part of the driver assistance system 2 or part of the motor vehicle 1.

In particular, it can be provided that the item of functional state information is displayed on a display unit of the motor vehicle 1, so that an occupant, in particular a driver, of the motor vehicle 1 is presently informed about the functional state of the optical acquisition device 3.

In particular, it can furthermore be provided that the functional state of the housing 8 and/or the housing part 9 is checked multiple times, in particular at predetermined time intervals. The functional state can thus be continuously monitored in particular, whereby an adverse effect of a person is reduced.

The type of the emergency mode can advantageously be set in dependence on the type of the undesired actual functional state. For example, a complete prevention of emission of light beams 6 can occur as a first type of the emergency mode if the housing part 9 is removed or if a fracture or a crack of the housing part 9 has occurred in a main region of the housing part 9, through which the emission of the light beams 6 primarily takes place. An active emission of the light beams 6 having reduced light power can be formed as an example of a second type of the emergency mode. This can be the case in the event of small impairments of the housing part 9, which have occurred at the edge, for example, and through which the light beams 6 are not primarily emitted.

The invention claimed is:

1. An optical acquisition device for a motor vehicle, comprising:
   a housing of the optical acquisition device, in which a light source unit of the optical acquisition device is arranged,
   wherein light beams are emitted by the light source unit through a housing part of the housing into surroundings of the motor vehicle; and
   a checking unit, by which a functional state of the housing is checkable, and when an actual functional state of the housing deviating from a reference functional state of the housing is detected, a control signal is generated; and
   a heating unit which includes a heating wire,
   wherein the housing and/or the housing part at least regionally comprises the heating wire integrated into the housing and/or into the housing part and the functional state of the housing is detectable by checking electrical resistance of the heating wire.

2. The optical acquisition device according to claim 1, wherein the functional state of the housing part is checkable by the checking unit, and when an actual functional state of the housing part deviating from a reference functional state of the housing part is detected, a control signal is generated.

3. The optical acquisition device according to claim 1, wherein the housing part removed from the housing is an actual functional state deviating from the reference functional state.

4. The optical acquisition device according to claim 1, wherein a fracture and/or a crack of the housing part is an actual functional state deviating from the reference functional state.

5. The optical acquisition device according to claim 1, wherein the electrically conductive element is integrated in a meandering shape into the housing and/or the housing part.

6. The optical acquisition device according to claim 1, wherein when an actual functional state deviating from the reference functional state of at least the housing part of the housing is detected, a control signal is generated, so that the light source unit is switched off.

7. The optical acquisition device according to claim 1, wherein when an actual functional state deviating from the reference functional state of at least the housing part of the housing is detected, a control signal is generated, so that the light beams are emitted having reduced power of the light source unit.

8. The optical acquisition device according to claim 1, wherein the functional state is checkable in a driving mode of the motor vehicle and/or at a standstill of the motor vehicle.

9. The optical acquisition device according to claim 1, wherein upon occurrence of the actual functional state deviating from the reference functional state, an item of functional state information is generated for a control unit of the optical acquisition device and/or the motor vehicle.

10. The optical acquisition device according to claim 9, wherein the item of functional state information is an error message displayable on a display unit of the motor vehicle.

11. The optical acquisition device according to claim 1, wherein the functional state of the housing and/or the housing part is checkable at predetermined time intervals.

12. A motor vehicle having an optical acquisition device according to claim 1.

13. A method for operating an optical acquisition device for a motor vehicle, comprising:
   emitting light beams through a housing part of a housing, from the housing into surroundings of the motor vehicle, using a light source unit of the optical acquisition device arranged in the housing of the optical acquisition device;
   checking a functional state of the housing by a checking unit; and
   generating a control signal when an actual functional state of the housing deviating from a reference functional state is detected,
   wherein the optical acquisition device includes a heating unit, and the heating unit includes a heating wire,
   wherein the housing and/or the housing part at least regionally comprises the heating wire integrated into the housing and/or into the housing part, and
   wherein checking the functional state of the housing comprises checking electrical resistance of the heating wire.

* * * * *